(12) United States Patent
Dierksmeier et al.

(10) Patent No.: US 7,789,621 B2
(45) Date of Patent: Sep. 7, 2010

(54) GAS TURBINE ENGINE AIRFOIL

(75) Inventors: Douglas David Dierksmeier, Franklin, IN (US); Jeffrey F. Rhodes, Zionsville, IN (US); Tab Michael Heffernan, Plainfield, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 804 days.

(21) Appl. No.: 11/475,650

(22) Filed: Jun. 27, 2006

(65) Prior Publication Data

US 2010/0074759 A1 Mar. 25, 2010

Related U.S. Application Data

(60) Provisional application No. 60/694,219, filed on Jun. 27, 2005.

(51) Int. Cl.
*F01D 5/14* (2006.01)
(52) U.S. Cl. ............. 415/191; 416/224; 416/241 B
(58) Field of Classification Search ........... 415/191, 415/200; 416/224, 226, 229 R, 229 A, 235, 416/241 B
See application file for complete search history.

(56) References Cited

U.S. PATENT DOCUMENTS

| | | | |
|---|---|---|---|
| 3,378,228 A * | 4/1968 | Davies et al. ............ 416/95 |
| 3,443,792 A | 5/1969 | Moss | |
| 3,844,727 A | 10/1974 | Copley et al. | |
| 3,844,728 A | 10/1974 | Copley et al. | |
| 4,247,259 A | 1/1981 | Saboe et al. | |
| 4,563,128 A * | 1/1986 | Rossmann ............... 416/92 |
| 4,728,262 A | 3/1988 | Marshall | |
| 5,005,304 A | 4/1991 | Briscoe et al. | |
| 5,236,151 A * | 8/1993 | Hagle et al. ............ 244/117 A |
| 5,354,176 A * | 10/1994 | Schilling et al. ........ 416/204 R |
| 5,553,455 A | 9/1996 | Craig et al. | |
| 5,634,771 A | 6/1997 | Howard et al. | |
| 6,213,714 B1 | 4/2001 | Rhodes | |
| 6,224,339 B1 | 5/2001 | Rhodes et al. | |
| 6,270,318 B1 | 8/2001 | Shah et al. | |
| 6,322,322 B1 | 11/2001 | Rhodes et al. | |
| 6,514,040 B2 | 2/2003 | Lewis et al. | |
| 6,652,228 B2 | 11/2003 | Tiemann | |
| 6,733,907 B2 | 5/2004 | Morrison et al. | |
| 2003/0031556 A1 | 2/2003 | Mulcaire et al. | |
| 2003/0082048 A1 | 5/2003 | Jackson et al. | |
| 2003/0207155 A1 | 11/2003 | Morrison et al. | |

* cited by examiner

*Primary Examiner*—Edward Look
*Assistant Examiner*—Nathaniel Wiehe
(74) *Attorney, Agent, or Firm*—Krieg DeVault LLP; Matthew D. Fair (57) ABSTRACT

A gas turbine engine airfoil including at least one outer tile coupled to a supporting member. The outer tile is coupled to the supporting member by a pin passing though the supporting member and the outer tile.

11 Claims, 6 Drawing Sheets

GAS TURBINE ENGINE AIRFOIL

CROSS-REFERENCE TO RELATED APPLICATIONS

The present application claims the benefit of U.S. Provisional Patent Application No. 60/694,219, filed on Jun. 27, 2005, which is incorporated herein by reference.

BACKGROUND

The present invention relates generally to gas turbine engine airfoils and more particularly, but not exclusively, to a gas turbine engine airfoil having an outer flow surface defined by tiles held in position with retaining pins. Although, the present inventions were developed for use in gas turbine engines, certain applications may be outside this field.

A long recognized need by gas turbine engine designers is to attain higher operating temperatures in order to achieve both a greater thermodynamic efficiency and increased power output per unit of engine weight. Theoretically, a gas turbine engine would operate at stoichiometric combustion in order to extract the greatest possible energy from the fuel consumed. However, temperatures at stoichiometric and even near stoichiometric combustion are generally beyond the endurance capabilities of traditional metallic gas turbine engine components. Consequently, significant efforts have focused on developing enhanced cooling techniques and temperature and oxidation resistant metals for use in components of the engine, which are exposed to the higher temperatures.

An alternate approach to the attainment of higher operating temperatures in a gas turbine engine involves the use of components formed from ceramic materials. Ceramic materials are better able to withstand the high temperature oxidizing environment within the gas turbine engine. However, while many ceramic materials exhibit superior high temperature strength and oxidation resistance, they have historically been difficult to utilize in gas turbine engines.

Heretofor, there has been a need for light weight high temperature gas turbine engine components. The present invention satisfies this need in a novel and unobvious way.

SUMMARY

One embodiment according to the present invention is a unique airfoil for a gas turbine engine. Other embodiments include unique apparatuses, systems, devices, hardware, methods, and combinations of these for defining a gas turbine engine blade or vane. Further embodiments, forms, objects, features, advantages, aspects, and benefits of the present invention shall become apparent from the following description and drawings.

BRIEF DESCRIPTION OF THE DRAWINGS

FIG. 6 is an enlarged view of FIG. 4a.

DESCRIPTION OF THE ILLUSTRATIVE EMBODIMENTS

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention is illustrated therein being contemplated as would normally occur to one skilled in the art to which the invention relates.

Figure 1:
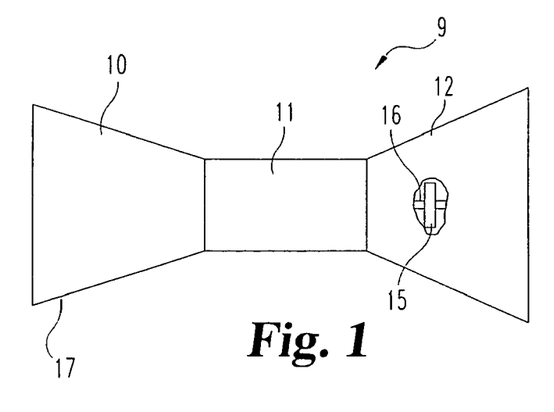
FIG. 1 is a schematic representation of a gas turbine engine.

With reference to FIG. 1, there is illustrated a schematic representation of a gas turbine engine 9. This non limiting depiction of gas turbine engine 9 includes a compressor section 10, a combustor section 11, and a turbine section 12. A person of ordinary skill in the art should appreciate that there are a multitude of ways in which the gas turbine engine components may be linked together. For instance, the engine may include a fan stage, a nozzle and/or additional compressors and turbine stages may be added with intercoolers connecting between the compressor stages. The present inventions are contemplated as being applicable with virtually all types and configurations of gas turbine engines.

The gas turbine engines contemplated herein are applicable for use in aircraft, as industrial power plants, and as propulsion systems in vehicles and vessels. Industrial power plant applications include, for example, pumping sets for gas and oil transmission lines and electricity generation systems. The term "aircraft" is generic and includes helicopters, airplanes, missiles, unmanned space devices, transatmospheric vehicles and other substantially similar devices.

Turbine section 12 includes at least one rotor 15 having a plurality of turbine blades coupled thereto. A rotatable shaft 16 is located within a mechanical housing/case 17 of the turbine section 12 and is coupled to the rotor 15. The rotor 15 and the shaft 16 may also be integrated together into a unitary component. The rotatable shaft 16 and the rotor 15 are supported by a plurality of bearings. As the hot exhaust gas passes from the combustor section 11 the plurality of turbine blades rotate as the gas expands and functions to extract work from the hot exhaust flow. While the present disclosure will be with reference to a turbine blade it is contemplated that forms of the present invention will be applicable to other gas turbine engine components including, but not limited to, fan blades, compressor blades and compressor and turbine vanes. The term airfoil may be utilized herein to refer to blades and/or vanes, unless specifically provided to the contrary.

Figure 2:
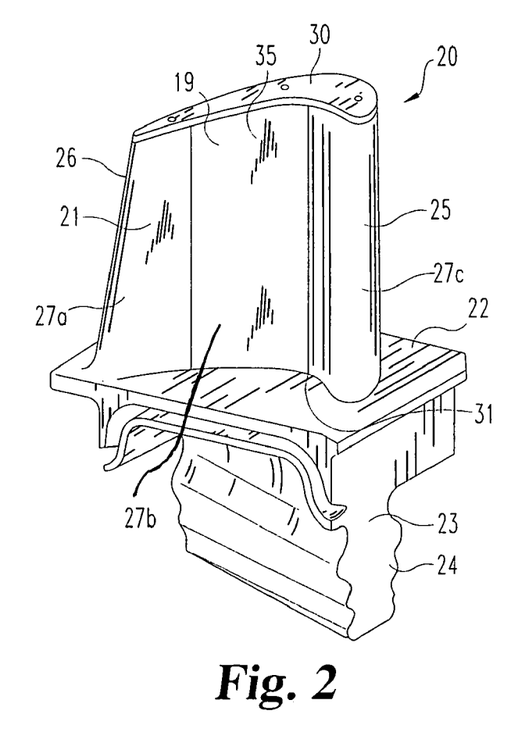
FIG. 2 is perspective view of one embodiment of a gas turbine engine airfoil.

With reference to FIG. 2, there is illustrated a non-limiting perspective view of a turbine blade 20. The present application contemplates a great variety of blade designs and geometries. Blade 20 includes an airfoil portion 21, a platform portion 22 and a shank portion 23. The shank portion 23 may include a mechanical attachment, such as a dovetail, firtree, or root pinning. Airfoil portion 21 includes a leading edge 25, a trailing edge 26 and an outer surface 19 extending therebetween. The outer surface will generally include a pressure side surface, a suction side surface, a leading edge surface and a trailing edge surface. In one form of the present invention, the outer surface 19 (only pressure side 35 is shown) is defined by a plurality of members/tiles 27; including for example members/tiles 27a, 27b 27c (the suction side members/tiles 27 are not illustrated). In one form the outer surface 19 is adapted to be located in the hot exhaust gas flow passing from the combustor section 11. However, the outer surface 19 may also be adapted/capable of being located with the working fluid flow within the compression stages of the gas turbine engine.

The present inventions contemplate that the outer surface 19 may be covered by a different quantity of members/tiles 27 and/or have a portion that is not defined by a member/tile 27. The members/tiles 27 may be formed of a variety of materials including, but not limited to ceramic, intermetallic, ceramic matrix composite, metallic, and a thermal barrier coated material. In one form the thermal barrier coated material is a metallic material. The plurality of members/tiles 27 may be formed of the same material or may be formed of a different material for some or all of the members/tiles 27. The present application contemplates that the members/tiles 27 may have a three dimensional shaped outer surface. In another form of the present application the outer surface of at least one of the members/tiles 27 is substantially flat/planer. Further, the present invention contemplates that the resulting aggregate outer surface may have a three dimensional shape or the resulting aggregate outer surface may have a substantially flat/planer configuration.

Hereinafter, the term spanwise will indicate an orientation between a tip 30 and an opposite other end 31, which is often referred to as the hub; and the term streamwise will indicate an orientation between the leading edge 25 and the trailing edge 26. The outer surface 19 includes a concave pressure side 35 and a convex suction side (not illustrated).

Figure 3:
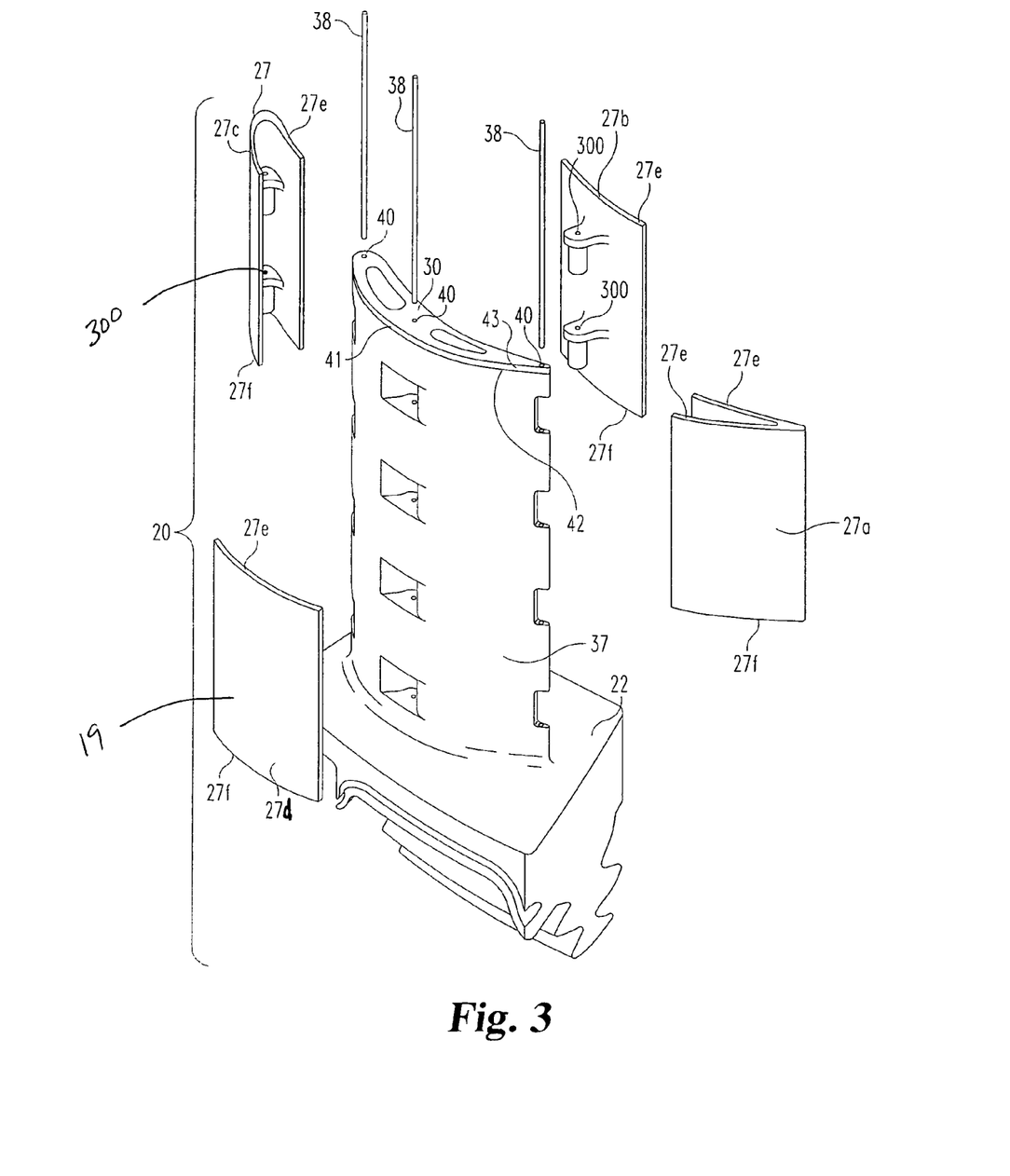
FIG. 3 is an exploded view of one form of a gas turbine engine airfoil of the present invention.

With reference to FIG. 3, there is illustrated an exploded view of one form of turbine blade 20. As discussed previously the outer surface 19 may be defined by a plurality of members/tiles 27a, 27b, 27c and 27d that are coupled to a structural member 37. The present inventions are not limited to four tiles as depicted in FIG. 3 unless provided specifically to the contrary and the plurality of tiles may include any combination of two or more members/tiles. In one form of the present invention the plurality of members/tiles 27 are removably coupled to the structural member 37. Structural member 37 may be referred to as a spar, and the spar/structural member 37 may have an outer profile that corresponds to the airfoil shape of the outer surface 19. In another form, the outer profile of the spar/structural member 37 does not correspond to the airfoil shape of the outer surface 19.

The plurality of members/tiles 27 are mechanically coupled to the spar/structural member 37 by a plurality of retaining members 38. In one form the retaining members 38 are defined by a retaining pin/rod. Each of the retaining members passes through holes 40 defined in the spar/structural member 37 and corresponding holes 300 formed in members/tiles 27. In one form there is clearance between the retaining member and the hole(s) in the spar/structure member and the hole(s) in member/tiles.

The spar/structural member 37 is formed of a material suitable for operating within the environment of a turbine section of a gas turbine engine. In one form the spar/structural member 37 is formed of a heat resistant superalloy composition. There are various types of superalloy compositions, such as but not limited to nickel based or cobalt based compositions. The spar/structural member 37 in one form is a unitary cast configuration. However, alternative embodiments of the spar/structural member 37 contemplate an assembly of cast components and/or wrought components. The spar/structural member 37 may be an of equiax, directionally solidified or a single crystal structure. In one form the spar/structural member 37 is a cast integral single crystal structure. Further, the present inventions contemplate that the spar may be formed of material appropriate for use in the compression stages of the gas turbine engine.

The spar/structural member 37 includes tip portion 30. In one form the tip portion 30 includes an outwardly extending lip 41 disposed around the outer surface 19. The lip 41 defines a shoulder 42 that the upper edge 27e of the plurality of members/tiles 27 is disposed adjacent. In one form of the present invention the portion of the outer surface defined by the plurality of members/tiles 27 is aligned with an outer surface 43 of lip 41. However, the present application contemplates other relationships between the upper edge 27e of the plurality of members/tiles 27 and the lip 41.

The lower edge 27f of the plurality of members/tiles 27 is disposed adjacent the platform 22. In one form, (not illustrated) each of the lower edges 27f may be disposed within a groove formed in the platform 22 around the spar/structural member 37.

Figure 4A:
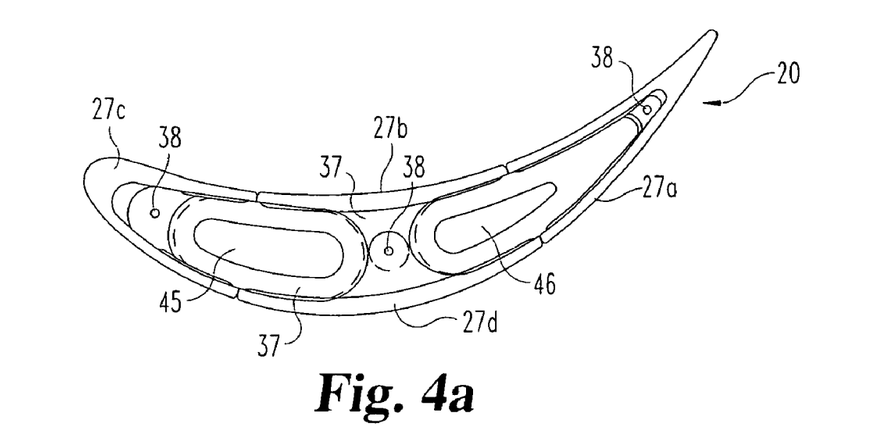
FIG. 4a is a cross-sectional view of one embodiment of a gas turbine engine airfoil of the present invention.
Figure 4B:
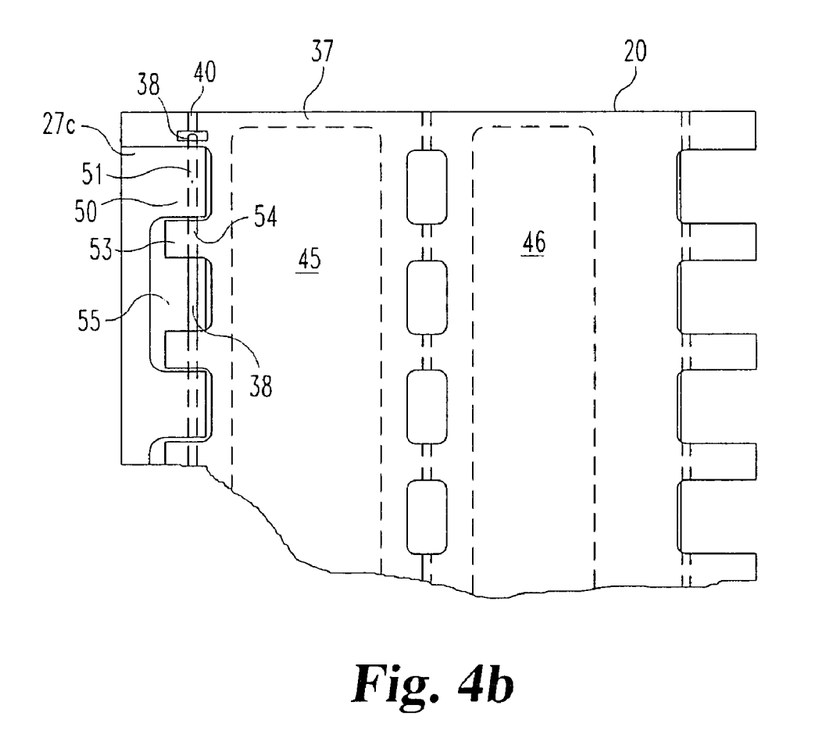
FIG. 4b is partial side view of one embodiment of a gas turbine engine airfoil of the present invention.

With reference to FIGS. 4a and 4b, there are illustrated further details regarding one embodiment of turbine blade 20. The plurality of members/tiles 27 are attached to the spar 37 by the retaining members 38. A pair of cooling fluid passages 45 and 46 is formed in the spar and extends spanwise from the shank portion 25 of the turbine blade 20. The plurality of members/tiles 27 are defined as follows: 27a trailing edge portion; 27b pressure side portion; 27c leading edge portion; and 27d suction side portion. Referring to FIG. 4b, there is illustrated the relationship between spar/structural member 37 and the leading edge portion member/tile 27c. The retaining pin 38 passes through the respective hole 51 formed in the attachment portion 50 of the leading edge member/tile 27c. The spar/structural member 37 includes a corresponding attachment portion 53 having a corresponding hole 54. The spar/structural member 37 and the leading edge member/tile 27c include a plurality of attachment portions that mate one with another and receive retaining pin 38. The present application contemplates that there may be regions such as 55 defined in the spar/structural member 37 that do not receive a corresponding attachment portion 50 of the member/tile 27. However, in some forms of the present invention each of the attachment portions 53 has a corresponding attachment portion 50. A substantially similar structure is utilized to attach each of the other members/tiles 27 to the spar/structural member 37.

Figure 5A:
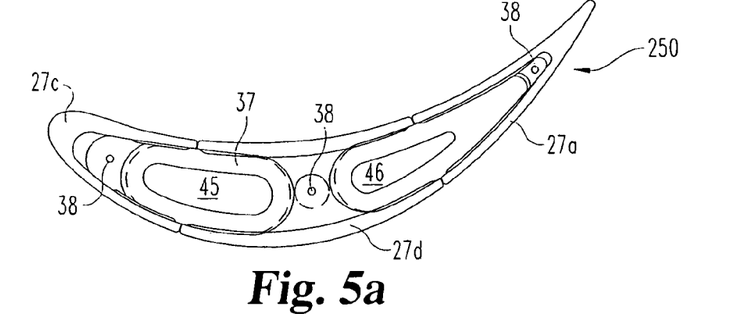
FIG. 5a is a cross-sectional view of one embodiment of a gas turbine engine airfoil of the present invention.
Figure 5B:
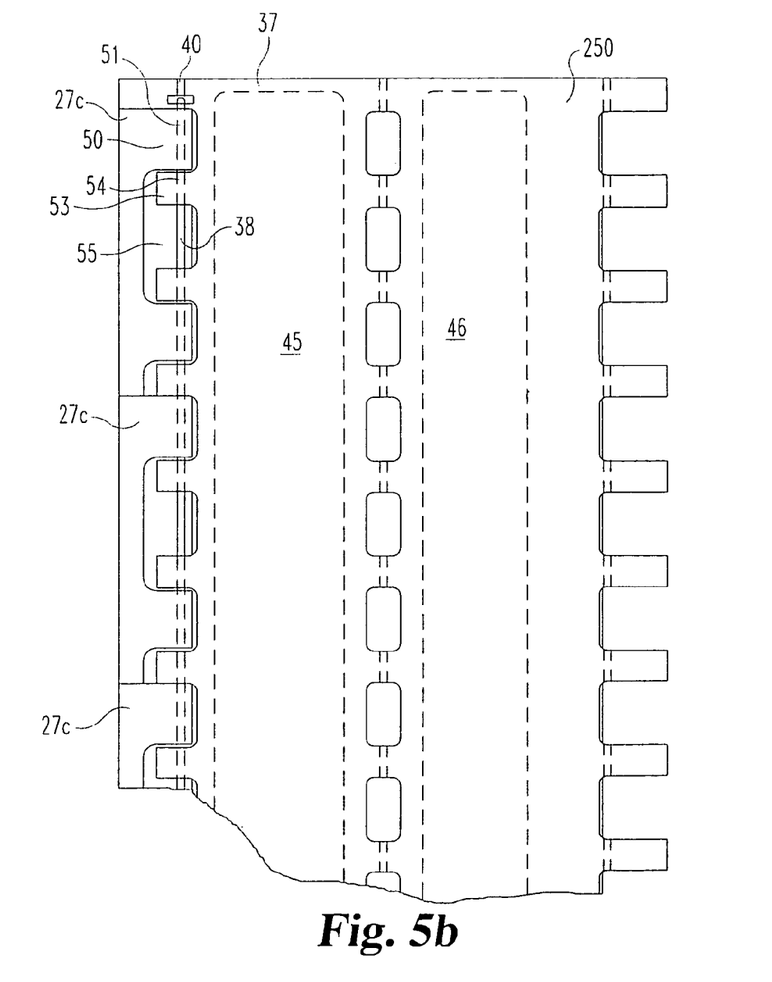
FIG. 5b is partial side view of one embodiment of a gas turbine engine airfoil of the present invention.

With reference to FIGS. 5a and 5b, there is illustrated another embodiment of a turbine blade represented by feature number 250. The turbine blade 250 depicted in FIGS. 5a and 5b is substantially similar to the turbine blade 20 depicted in FIGS. 4a and 4b. However, turbine blade 250 includes a plurality of leading edge portion members/tiles 27c stacked in the spanwise direction. In one form the plurality of leading edge portion members/tiles 27c extends from adjacent the lip 41 to the platform 22. It is contemplated in the present application that one portion (leading edge portion, trailing edge portion, suction side portion, pressure side portion) may utilize a single member/tile 27 to cover the respective spanwise and/or streamwise area while another portion utilizes a plurality of members/tiles 27 to cover the respective spanwise and/or streamwise area. Further, the present application contemplates that each portion may utilize a plurality of member/tiles 27 to cover the spanwise direction and the number of members/tiles 27 may vary between portions.

Figure 6:
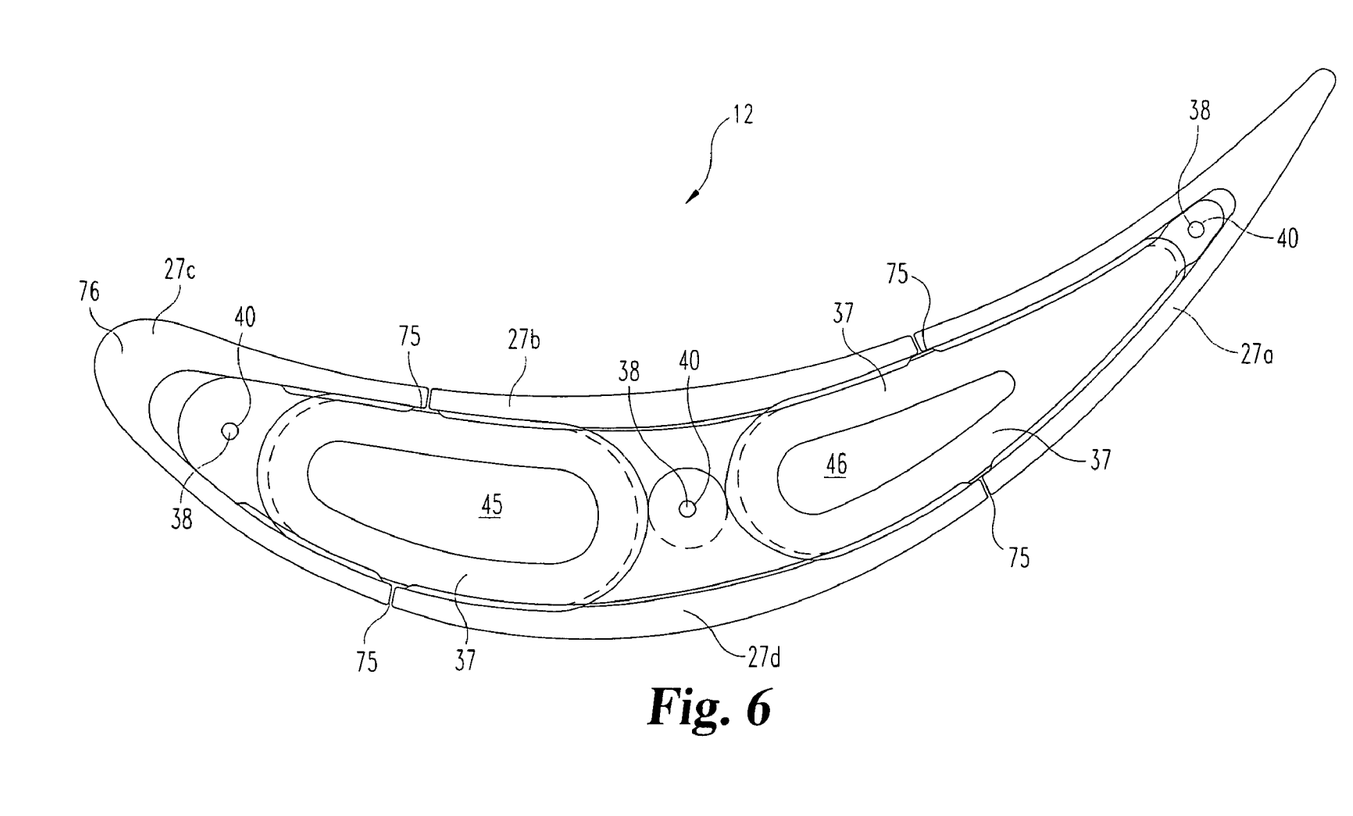

With reference to FIG. 6, there is illustrated an enlarged cross sectional view of one embodiment of turbine blade 20.

In one form of the present invention a plurality of wear pads 75 are disposed between the members/tiles 27 and the spar/structural member 37. In one form the plurality of wear pads 75 are coated with a thermal barrier coating. In one form the present application contemplates that the members/tiles 27 are preloaded into position to ensure contact between the wear pads 75 and the members/tiles 27. In another form of the present invention it is contemplated that he wear pads 75 are not coated with a thermal barrier coating.

The present application contemplates that in one embodiment the thickness of the leading edge portion member/tile 27c has been thickened relative to the rest of the other members/tiles not located at the leading edge portion. The thickened region is indicated by feature number 76 and may be utilized to increase the resistance to foreign object damage.

Figure 7:
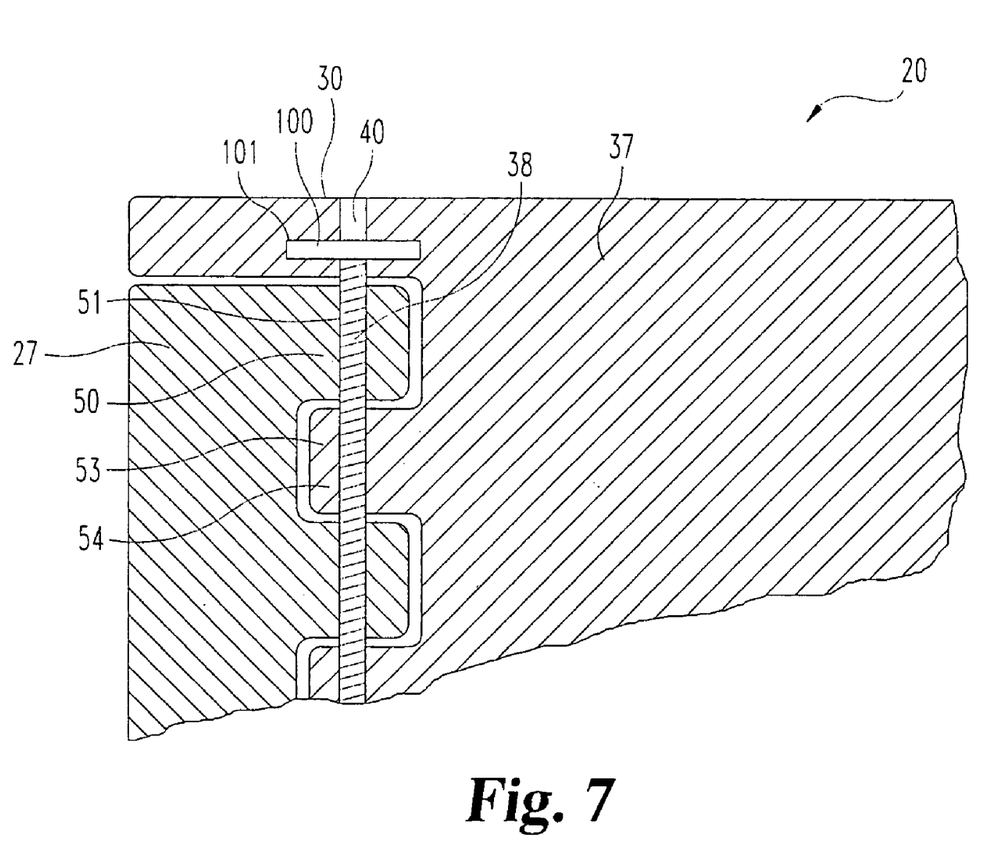
FIG. 7 is an illustrative cross sectional view depicting a portion of a gas turbine engine airfoil comprising a tile coupled to a spar member.

Referring to FIG. 7, there is depicted a schematic illustration of a portion of member/tile 27 attached to spar/structural member 37. The retaining pin 38 is passed through hole 40 in the tip 30 of the turbine blade 20. The retaining pin 38 passes through the attachment portions 50 and 53 and bottoms out against a stop (not illustrated) at the opposite other end 31 (FIG. 2) in the spanwise direction of the turbine blade. A keeper 100 is inserted into opening 101 to lock the retaining pin 38 in place. In one form the keeper 100 is a sheet metal member that is inserted into the opening 100. However, other techniques of locking the retaining pin 38 in place are contemplated herein.

One form of the present invention contemplates a gas turbine engine blade, comprising: a structural member; a cover member having an outer surface defining a portion of a flow surface; and a pin located within said structural member and passing through said structural member and said cover member to couple said cover member to said structural member. The gas turbine engine blade of the present invention further contemplates that said cover member defines a plurality of cover members; wherein said pin defines a plurality of pins; and wherein said plurality of cover members are coupled to said structural member by said pins. The gas turbine engine blade of the present invention further contemplates that said cover member defines a plurality of cover members; wherein said pin defines a plurality of pins; and wherein said plurality of cover members are coupled to said structural member by said pins; wherein each of said plurality of cover members includes a first fingered attachment portion; wherein said structural member includes a second fingered attachment portion; wherein said fingered attachment portions engage to define an engaged fingered attachment portion; and wherein one of said plurality of pins passes through each of said engaged fingered attachment portions. The gas turbine engine blade of the present invention further contemplates that said cover member defines a plurality of cover members; wherein said pin defines a plurality of pins; and wherein said plurality of cover members are coupled to said structural member by said pins; wherein each of said plurality of cover members includes a first fingered attachment portion; wherein said structural member includes a second fingered attachment portion; wherein said fingered attachment portions engage to define an engaged fingered attachment portion; and wherein one of said plurality of pins passes through each of said engaged fingered attachment portions and that at least one of said plurality of cover members is formed of a ceramic material. The gas turbine engine blade of the present invention further contemplates that said cover member defines a plurality of cover members; wherein said pin defines a plurality of pins; and wherein said plurality of cover members are coupled to said structural member by said pins; wherein each of said plurality of cover members includes a first fingered attachment portion; wherein said structural member includes a second fingered attachment portion; wherein said fingered attachment portions engage to define an engaged fingered attachment portion; and wherein one of said plurality of pins passes through each of said engaged fingered attachment portions and that said plurality of cover members is formed of a ceramic material. The gas turbine engine blade of the present invention further contemplates that said cover member defines a plurality of cover members; wherein said pin defines a plurality of pins; and wherein said plurality of cover members are coupled to said structural member by said pins; wherein each of said plurality of cover members includes a first fingered attachment portion; wherein said structural member includes a second fingered attachment portion; wherein said fingered attachment portions engage to define an engaged fingered attachment portion; and wherein one of said plurality of pins passes through each of said engaged fingered attachment portions and that said plurality of cover members is formed of a ceramic material and wherein said plurality of cover members defining an airfoil shaped outer surface. The gas turbine engine blade of the present invention further contemplates that said cover member defines a plurality of cover members; wherein said pin defines a plurality of pins; and wherein said plurality of cover members are coupled to said structural member by said pins; wherein each of said plurality of cover members includes a first fingered attachment portion; wherein said structural member includes a second fingered attachment portion; wherein said fingered attachment portions engage to define an engaged fingered attachment portion; and wherein one of said plurality of pins passes through each of said engaged fingered attachment portions and that said plurality of cover members is formed of a ceramic material and wherein said plurality of cover members defining an airfoil shaped outer surface and which further includes a plurality of keeper members located within said structural member, each of said plurality of keeper members locking at least one of said plurality of pins. The present invention further contemplates the gas turbine engine blade wherein at least one of said plurality of pins couples at least two of said cover members to said structural member. The present invention further contemplates the gas turbine engine blade wherein said structural member and said cover member are formed of different materials. The present invention further contemplates the gas turbine engine blade which further includes a keeper member located within said structural member, said keeper member locking said pin. The present invention further contemplates the gas turbine engine blade wherein said cover member defines a plurality of cover members; wherein said pin defines a plurality of pins; wherein said plurality of cover members are coupled to said structural member by said pins; and wherein said plurality of cover members define an airfoil shaped outer surface. The present invention further contemplates the gas turbine engine blade wherein said cover member includes a first fingered attachment portion having a first hole; wherein said structural member includes a second fingered attachment portion having a second hole; wherein said fingered attachment portions engage and place said holes in registry; and wherein said pin passes through said holes of the fingered attachment portions. The present invention further contemplates that a wear pad located is between said structural member and said cover member. The present invention further contemplates that said structural member includes a lip and wherein said cover member is located adjacent said lip.

Another form of the present invention contemplates a gas turbine engine component, comprising: a supporting member; a plurality of tiles defining at least a portion of an outer fluid flow surface; and means for attaching said plurality of tiles to said supporting member. The present invention further contemplates the gas turbine engine component wherein said supporting member having a spanwise length and a streamwise length; each of said plurality of tiles extending the spanwise length of the component and none of said plurality of tiles extending the streamwise length of the component. The present invention further contemplates the gas turbine engine component wherein said supporting member is an integrally cast single crystal metallic structure; and wherein at least one of said plurality of tiles is formed of a ceramic material. The present invention further contemplates the gas turbine engine component wherein said supporting member is an integrally cast single crystal metallic structure; and wherein at least one of said plurality of tiles is formed of a ceramic material and wherein at least one of said plurality of tiles is formed of a material other than ceramic. The present invention further contemplates the gas turbine engine component wherein the component is a vane. The present invention further contemplates the gas turbine engine component wherein the component is a blade.

Another form of the present invention contemplates a gas turbine engine blade, comprising: a plurality of retaining members; a spar including a leading edge attachment portion, a trailing edge attachment portion, a suction side attachment portion and a pressure side attachment portion; a first ceramic tile having an outer surface defining a leading edge portion, and said first ceramic tile has a first attachment portion attached to said leading edge attachment portion by one of said plurality of retaining members; a second ceramic tile having an outer surface defining a trailing edge portion, and said second ceramic tile has a second attachment portion attached to said trailing edge attachment portion by one of said plurality of retaining members; a third ceramic tile having an outer surface defining a suction side portion, and said third ceramic tile has a third attachment portion attached to said suction side portion by one of said plurality of retaining members; and a fourth ceramic tile having an outer surface defining a pressure side portion, and said fourth ceramic tile has a fourth attachment portion attached to said pressure side portion by one of said plurality of retaining members. The present invention further contemplates the gas turbine engine blade which further includes a plurality of keepers, one of said plurality of keepers locking each of said plurality of retaining members. The present invention further contemplates the gas turbine engine blade wherein said spar includes a spanwise length and each of said ceramic tiles extending said entire spanwise length. The present invention further contemplates the gas turbine engine blade wherein said spar includes a spanwise length, said first ceramic tile defines a plurality of first ceramic tiles for extending said spanwise length; said second ceramic tile defines a plurality of second ceramic tiles for extending said spanwise length; said third ceramic tile defines a plurality of third ceramic tiles for extending said spanwise length; and said fourth ceramic tile defines a plurality of fourth ceramic tiles for extending said spanwise length.

In yet another form the present invention contemplates a gas turbine engine blade, comprising: a structural member; at least one pin; a plurality of cover members having an outer surface, at least one of said plurality of cover members is coupled to said structural member by said at least one pin which is located within said structural member.

In yet another form the present invention contemplates a gas turbine engine blade, comprising: a spar; a plurality of tiles; and attachment means for attaching said plurality of tiles to said spar.

In yet another form the present invention contemplates a gas turbine engine airfoil comprising: an airfoil shaped outer surface defined by a plurality of members, at least one of said plurality of members has a three dimensional shaped outer surface; a structural member disposed within said airfoil shaped outer surface and supporting said plurality of members; and a plurality of pins located within said airfoil shaped outer surface and attaching said plurality of members to said structural member.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A gas turbine engine blade, comprising:
    a structural member including a second fingered attachment portion;
    a plurality of cover members having an outer surface defining a portion of a flow surface, each of said plurality of cover members including a first fingered attachment portion;
    a plurality of pins located within said structural member and passing through said structural member and said cover members to couple said cover members to said structural member; and
    said fingered attachment portions engage to define engaged fingered attachment portions, and one of said plurality of pins passes through each of said engaged fingered attachment portions.

2. The gas turbine engine blade of claim 1, wherein at least one of said plurality of cover members is formed of a ceramic material.

3. The gas turbine engine blade of claim 1, wherein said plurality of cover members is formed of a ceramic material.

4. The gas turbine engine blade of claim 1, wherein said plurality of cover members defines an airfoil shaped outer surface.

5. The gas turbine engine blade of claim 1, which further includes a plurality of keeper members located within said structural member, each of said plurality of keeper members locking at least one of said plurality of pins.

6. The gas turbine engine blade of claim 1, wherein at least one of said plurality of pins couples at least two of said cover members to said structural member.

7. The gas turbine engine blade of claim 1, wherein said structural member and at least one of said cover members are formed of different materials.

8. The gas turbine engine blade of claim 1, which further includes a keeper member located within said structural member.

9. The gas turbine engine blade of claim 1, wherein each of said first fingered attachment portions having a first hole;
   wherein each of said second fingered attachment portions having a second hole;
   wherein said fingered attachment portions engage and place said holes in registry; and
   wherein one of said pins passes through said holes of the fingered attachment portions.

10. The gas turbine engine blade of claim 1, which further includes a wear pad located between said structural member and at least one of said cover members.

11. The gas turbine engine blade of claim 1, wherein said structural member includes a lip and wherein at least one of said cover members is located adjacent said lip.

* * * * *